US012315475B1

(12) United States Patent
Edwards et al.

(10) Patent No.: US 12,315,475 B1
(45) Date of Patent: May 27, 2025

(54) SELF-CONFORMING-RADIUS FRET PRESS FOR STRINGED INSTRUMENTS

(71) Applicant: J Edwards Guitars LLC, Austin, TX (US)

(72) Inventors: Jerame Brandon Edwards, Cibolo, TX (US); James Travis Roadman, San Antonio, TX (US)

(73) Assignee: J Edwards Guitars LLC, San Antonio, TX (US)

( * ) Notice: Subject to any disclaimer, the term of this patent is extended or adjusted under 35 U.S.C. 154(b) by 0 days.

(21) Appl. No.: 18/943,041

(22) Filed: Nov. 11, 2024

Related U.S. Application Data

(60) Provisional application No. 63/597,997, filed on Nov. 10, 2023.

(51) Int. Cl.
*G10D 3/06* (2020.01)

(52) U.S. Cl.
CPC .................................... *G10D 3/06* (2013.01)

(58) Field of Classification Search
CPC ...................................................... G10D 3/06
See application file for complete search history.

(56) References Cited

U.S. PATENT DOCUMENTS

2022/0087424 A1 * 3/2022 Goetz ................ A47C 1/03255
2022/0383837 A1 * 12/2022 Esparza ................... G10D 3/06

FOREIGN PATENT DOCUMENTS

KR 20040069732 A * 1/2003

* cited by examiner

*Primary Examiner* — Jianchun Qin
(74) *Attorney, Agent, or Firm* — Shannon W. Bates; Harper & Bates LLP

(57) ABSTRACT

A fret press device may include a cascading, tiered structure having at least a first tier and a second tier, with the first tier having a plurality of lobed feet each pivotally coupled to a component of the second tier. The device may be configured to couple to an apparatus operable to apply mechanical force. A system may include the fret press device and the apparatus, with the apparatus further including means for applying a mechanical force to the fret press device for installing a fret in a fret slot of a fingerboard of a stringed instrument. A method for seating a fret with a bass side and a treble side in a fret slot on a fingerboard of a stringed instrument may include use of the fret press device and the apparatus.

13 Claims, 12 Drawing Sheets

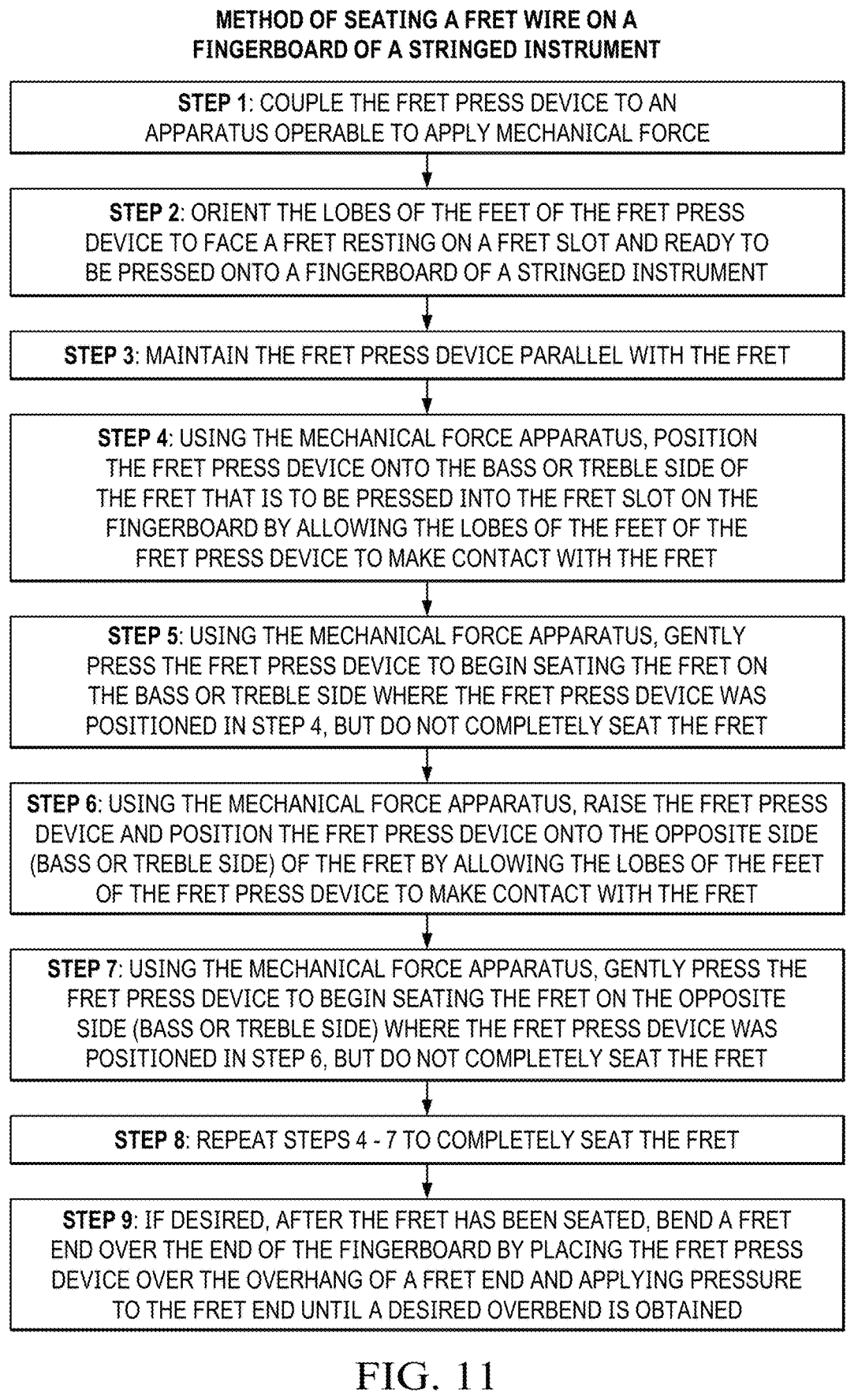

METHOD OF SEATING A FRET WIRE ON A FINGERBOARD OF A STRINGED INSTRUMENT

STEP 1: COUPLE THE FRET PRESS DEVICE TO AN APPARATUS OPERABLE TO APPLY MECHANICAL FORCE

↓

STEP 2: ORIENT THE LOBES OF THE FEET OF THE FRET PRESS DEVICE TO FACE A FRET RESTING ON A FRET SLOT AND READY TO BE PRESSED ONTO A FINGERBOARD OF A STRINGED INSTRUMENT

↓

STEP 3: MAINTAIN THE FRET PRESS DEVICE PARALLEL WITH THE FRET

↓

STEP 4: USING THE MECHANICAL FORCE APPARATUS, POSITION THE FRET PRESS DEVICE ONTO THE BASS OR TREBLE SIDE OF THE FRET THAT IS TO BE PRESSED INTO THE FRET SLOT ON THE FINGERBOARD BY ALLOWING THE LOBES OF THE FEET OF THE FRET PRESS DEVICE TO MAKE CONTACT WITH THE FRET

↓

STEP 5: USING THE MECHANICAL FORCE APPARATUS, GENTLY PRESS THE FRET PRESS DEVICE TO BEGIN SEATING THE FRET ON THE BASS OR TREBLE SIDE WHERE THE FRET PRESS DEVICE WAS POSITIONED IN STEP 4, BUT DO NOT COMPLETELY SEAT THE FRET

↓

STEP 6: USING THE MECHANICAL FORCE APPARATUS, RAISE THE FRET PRESS DEVICE AND POSITION THE FRET PRESS DEVICE ONTO THE OPPOSITE SIDE (BASS OR TREBLE SIDE) OF THE FRET BY ALLOWING THE LOBES OF THE FEET OF THE FRET PRESS DEVICE TO MAKE CONTACT WITH THE FRET

↓

STEP 7: USING THE MECHANICAL FORCE APPARATUS, GENTLY PRESS THE FRET PRESS DEVICE TO BEGIN SEATING THE FRET ON THE OPPOSITE SIDE (BASS OR TREBLE SIDE) WHERE THE FRET PRESS DEVICE WAS POSITIONED IN STEP 6, BUT DO NOT COMPLETELY SEAT THE FRET

↓

STEP 8: REPEAT STEPS 4 - 7 TO COMPLETELY SEAT THE FRET

↓

STEP 9: IF DESIRED, AFTER THE FRET HAS BEEN SEATED, BEND A FRET END OVER THE END OF THE FINGERBOARD BY PLACING THE FRET PRESS DEVICE OVER THE OVERHANG OF A FRET END AND APPLYING PRESSURE TO THE FRET END UNTIL A DESIRED OVERBEND IS OBTAINED

FIG. 11

SELF-CONFORMING-RADIUS FRET PRESS FOR STRINGED INSTRUMENTS

CROSS-REFERENCE TO RELATED APPLICATIONS

This application claims the benefit of U.S. Provisional Patent Application Ser. No. 63/597,997, filed Nov. 10, 2023 and entitled "Self-Conforming-Radius Fret Press for Stringed Instruments", which is incorporated herein by reference for all purposes.

TECHNICAL FIELD

The present disclosure relates to a fret press device, and more particularly, to a self-conforming-radius fret press device. The present disclosure also relates to associated systems and methods of installing fret wire into fingerboards of varying radii on a stringed instrument via the fret press device to build and repair stringed instruments.

BACKGROUND

When installing frets on a fingerboard of a stringed instrument such as a guitar, for example, technicians traditionally use a hammer to tap in the frets or a fixed radius fret press caul to press in the frets. Traditional fret press cauls are solid brass inserts that have a fixed concave radius to match the radius of the fingerboard.

Stringed instruments, such as guitars, may be built with fingerboards that have compound or conical radii, which means that each fret becomes progressively flatter down the neck of the fingerboard. To address fingerboards with compound or conical radii when installing frets using a fixed radius fret press caul, high volume factories conventionally exchange the fixed radius cauls fret-by-fret in an attempt to press frets into fret slots on a compound fingerboard. Factories conventionally address inconsistences and irregularities in a post-processing stage known as fret leveling.

Independent luthiers traditionally use a hammer to install frets in fret slots on a compound board. Use of a hammer may create divots, deform the fret, or encourage the fret to pop out of the fret slot on a fingerboard.

SUMMARY

The present disclosure is directed to various implementations of fret press devices and associated systems and methods for installing or seating fret wire into fret slots on fingerboards of stringed instruments.

In an implementation, the fret press device includes: a stem; a yoke coupled to the stem; a bulkhead having a top and a bottom, wherein the bottom has a first end and a second end, and wherein the yoke is pivotally coupled to the top of the bulkhead; a first interface plate having a top and a bottom, wherein the bottom of the first interface plate has a first end and a second end, and wherein the first end of the bulkhead is pivotally coupled to the top of the first interface plate; a first foot having a top and a bottom, wherein the bottom of the first foot has a curved surface including two lobes with a concave portion therebetween, and wherein the first end of the first interface plate is pivotally coupled to the top of the first foot; a second foot having a top and a bottom, wherein the bottom of the second foot has a curved surface including two lobes with a concave portion therebetween, and wherein the second end of the first interface plate is pivotally coupled to the top of the second foot; a third foot having a top and a bottom, wherein the bottom of the third foot has a curved surface including two lobes with a concave portion therebetween, and wherein the first end of the second interface plate is pivotally coupled to the top of the third foot; and a fourth foot having a top and a bottom, wherein the bottom of the fourth foot has a curved surface including two lobes with a concave portion therebetween, and wherein the second end of the second interface plate is pivotally coupled to the top of the fourth foot.

In another implementation, the fret press device includes: a yoke configured to couple to an apparatus operable to apply mechanical force, a bulkhead coupled to the yoke, at least two interface plates pivotally coupled to the bulkhead, and two lobed feet pivotally coupled to each of the interface plates.

In some implementations, the yoke may include a U-shaped component including a bottom, a first leg, and a second leg. In some implementations, the bottom of the U-shaped component of the yoke may couple to a stem, and the stem may couple to the apparatus. In some implementations, the bottom of the U-shaped component of the yoke may further couple to the bulkhead, and the legs of the U-shaped component of the yoke may couple to the apparatus.

In some implementations, the bulkhead may include a flat, substantially smooth component having a top and a bottom. In some implementations, the top of the bulkhead may couple to the yoke.

In yet another implementation, the fret press device includes: a cascading, tiered structure having at least a first tier and a second tier, wherein the first tier includes a plurality of lobed feet each pivotally coupled to a component of the second tier, and wherein the device is configured to couple to an apparatus operable to apply mechanical force.

In some implementations, a system may include the fret press device coupled to an apparatus operable to apply mechanical force. In various implementations, the apparatus may be an arbor press, a drill press, or a F-clamp.

In some implementations, a system may include the fret press device and the apparatus, wherein the apparatus includes means for applying a mechanical force to the fret press device for installing a fret in a fret slot of a fingerboard of a stringed instrument.

In some implementations, a method for seating a fret with a bass side and a treble side in a fret slot on a fingerboard of a stringed instrument using the fret press device and the apparatus includes: (a) positioning the fret press device above the fingerboard; (b) orienting the lobes of the feet of the fret press device to face the fret resting on the fret slot; (c) maintaining the fret press device parallel with the fret; (d) using the mechanical force apparatus, positioning the fret press device until the lobes of the feet of the fret press device make contact with the bass or treble side of the fret; (e) using the mechanical force apparatus, pressing the fret press device to begin seating the fret into the fret slot on the bass or treble side of the fret where the fret press device was positioned in step (d); (f) using the mechanical force apparatus, positioning the fret press device until the lobes of the feet of the fret press device make contact with the bass or treble side of the fret opposite the side that was selected in step (d); (g) using the mechanical force apparatus, pressing the fret press device to begin seating the fret into the fret slot on the bass or treble side of the fret selected in step (f); and (h) repeating steps (d) through (g) until the fret is seated in the fret slot.

In some implementations, the method may further include: after the fret has been seated, then using the mechanical force apparatus, positioning the fret press device to extend at least partially over an overhang of the fret and applying pressure between the fret press device and the overhang of the fret until a desired overbend of the overhang of the fret is obtained.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 11 illustrates a flowchart of an implementation of a method of seating a fret wire in a fret slot on a fingerboard of a stringed instrument, according to the present disclosure.

Like reference symbols in the various drawings indicate like elements.

DETAILED DESCRIPTION

The present disclosure relates to a fret press device, and more particularly, to a self-conforming-radius fret press device. The present disclosure also relates to associated systems and methods of installing fret wire into fingerboards of varying radii on a stringed instrument via the fret press device to build and repair stringed instruments.

As used herein, the terms "fret" and "fret wire" may be used interchangeably. Similarly, the terms "fingerboard" and "fretboard" may be used interchangeably. Likewise, the terms "seat", "install" and other similar terminology may be used interchangeably in the context of seating or installing a fret wire into a slot on a fingerboard of a stringed instrument.

Figure 1:
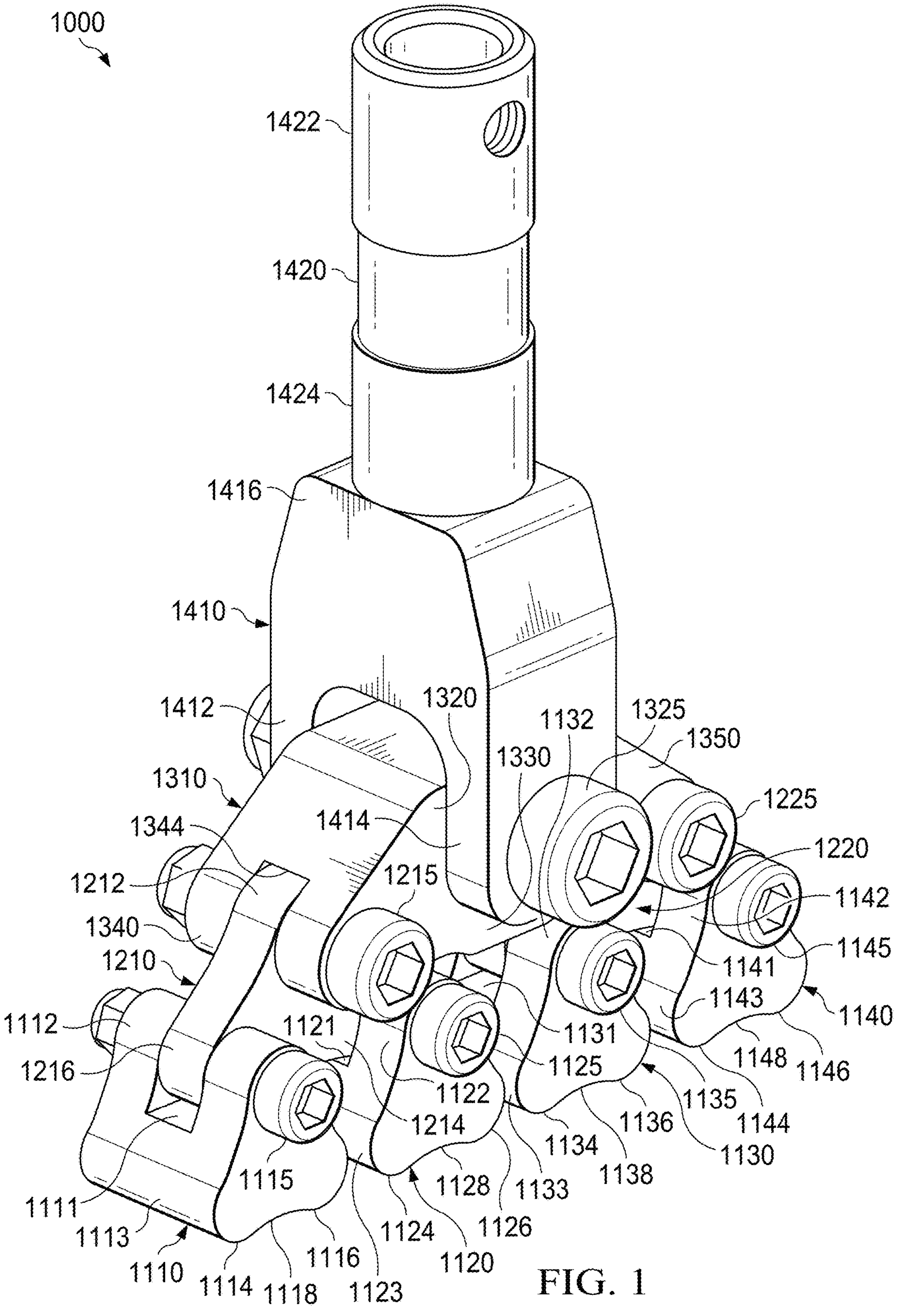
FIG. 1 illustrates a perspective view of an implementation of a fret press device, according to the present disclosure.
Figure 2:
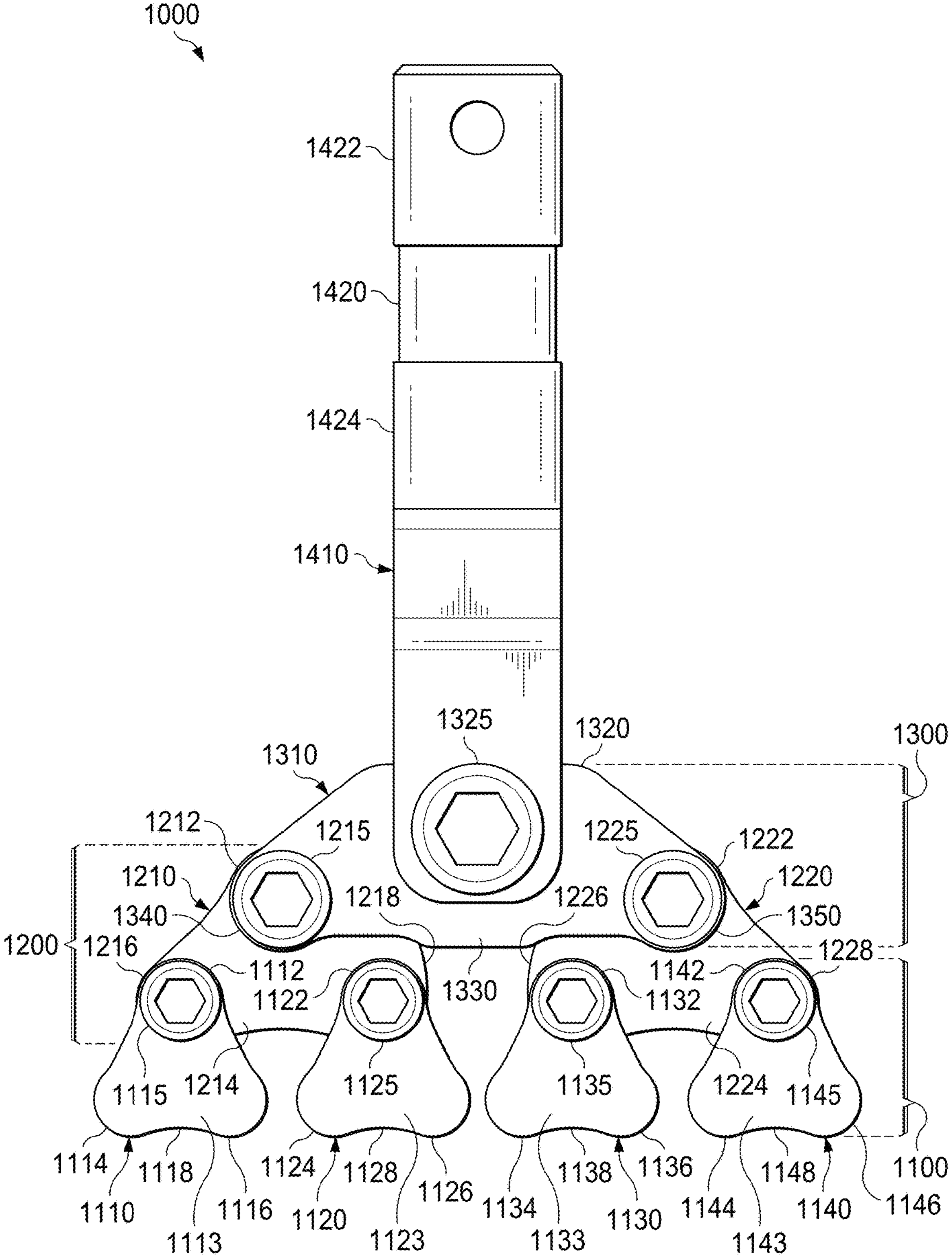
FIG. 2 illustrates a front view of the fret press device of FIG. 1, according to the present disclosure.
Figure 3:
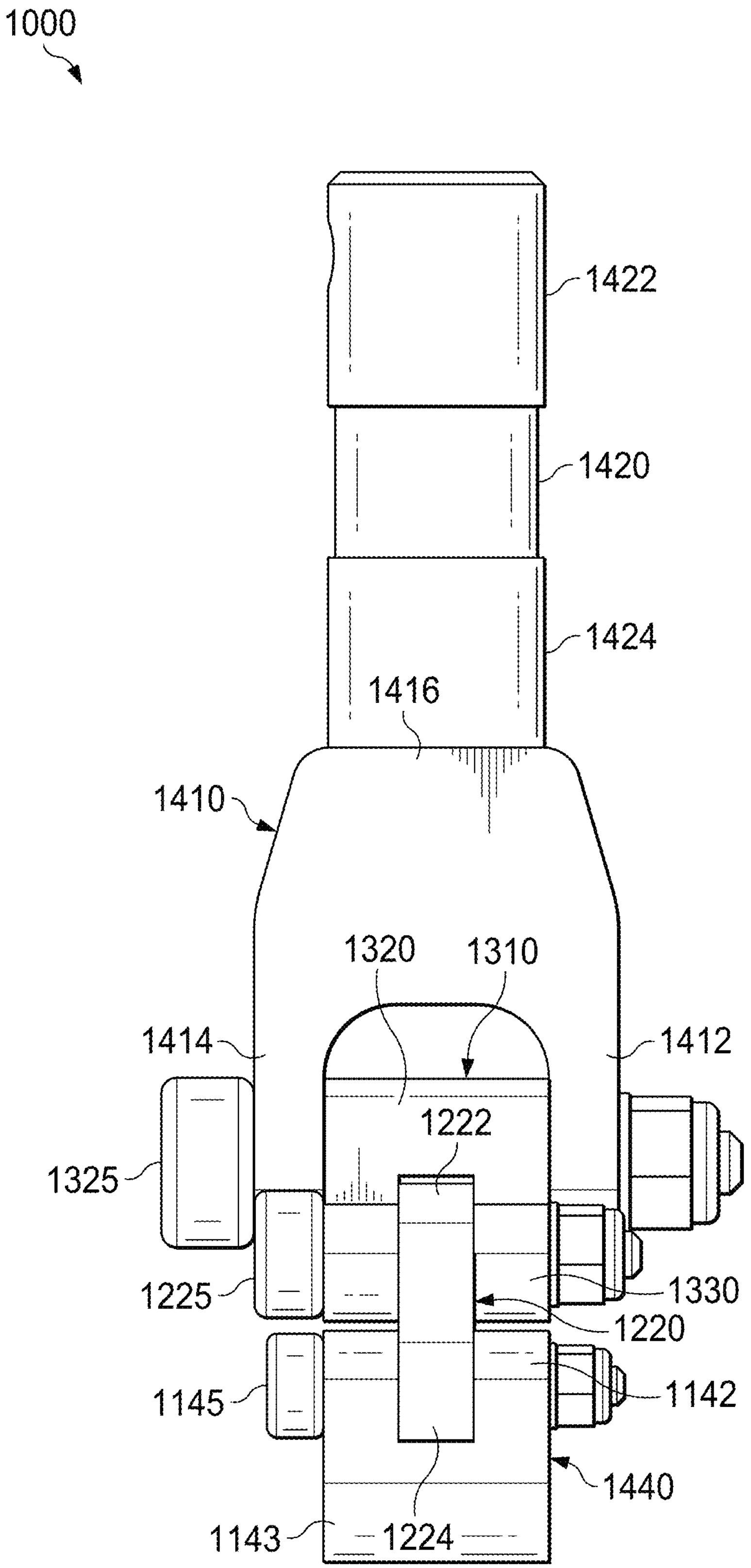
FIG. 3 illustrates a side view of the fret press device of FIG. 1, according to the present disclosure.

Referring now to the drawings, where like reference numerals represent like components, FIG. 1, FIG. 2, and FIG. 3 illustrate a perspective view, a front view, and a side view, respectively, of an implementation of a fret press device 1000 according to the present disclosure. The fret press device 1000 comprises a cascading, tiered structure that includes a first tier 1100, a second tier 1200, and a third tier 1300.

As shown in FIGS. 1 and 2, the first tier 1100 of the fret press device 1000 comprises a first foot 1110, a second foot 1120, a third foot 1130, and a fourth foot 1140 that are substantially similar in form. As best depicted in FIG. 2, the first foot 1110 has a top 1112 and a bottom 1113 with a curved surface comprising two lobes 1114 and 1116, and a concave portion 1118 between the lobes 1114 and 1116. The second foot 1120 has a top 1122 and a bottom 1123 with a curved surface comprising two lobes 1124 and 1126, and a concave portion 1128 between the lobes 1124 and 1126. The third foot 1130 has a top 1132 and a bottom 1133 with a curved surface comprising two lobes 1134 and 1136, and a concave portion 1138 between the lobes 1134 and 1136. The fourth foot 1140 has a top 1142 and a bottom 1143 with a curved surface comprising two lobes 1144 and 1146, and a concave portion 1148 between the lobes 1144 and 1146.

The first tier 1100 of the fret press device 1000 is coupled to the second tier 1200. As shown in FIGS. 1 through 3, the second tier 1200 may include a first interface plate 1210 and a second interface plate 1220 that are substantially similar in form. The first interface plate 1210 has a top 1212 and a bottom 1214 with a first end 1216 and a second end 1218. The second interface plate 1220 has a top 1222 and a bottom 1224 with a first end 1226 and a second end 1228.

In some implementations, the first tier 1100 and the second tier 1200 may be pivotally coupled through a plurality of fasteners, such as fasteners 1115, 1125, 1135, and 1145. In more detail, and as best depicted in FIG. 1, the top 1112 of the first foot 1110 may include a gap 1111 to receive the first end 1216 of the bottom 1214 of the first interface plate 1210. The top 1112 of the first foot 1110 and the first end 1216 of the first interface plate 1210 may have corresponding bores for receiving fastener 1115 that provides a pivotal coupling therebetween.

Similarly, and as best depicted in FIG. 1, the top 1122 of the second foot 1120 may include a gap 1121 to receive the second end 1218 of the bottom of 1214 of the first interface plate 1210. The top 1122 of the second foot 1120 and the second end 1218 of the first interface plate 1210 may have corresponding bores for receiving fastener 1125 that provides a pivotal coupling therebetween.

As best depicted in FIG. 1, the top 1132 of the third foot 1130 may include a gap 1131 to receive the first end 1226 of the bottom 1224 of the second interface plate 1220. The top 1132 of the third foot 1130 and the first end 1226 of the second interface plate 1220 may have corresponding bores for receiving fastener 1135 that provides a pivotal coupling therebetween.

Similarly, and as best depicted in FIG. 1, the top 1142 of the fourth foot 1140 may include a gap 1141 to receive the second end 1228 of the bottom 1224 of the second interface plate 1220. The top 1142 of the fourth foot 1140 and the second end 1228 of the second interface plate 1220 may have corresponding bores for receiving fastener 1145 that provides a pivotal coupling therebetween.

The second tier 1200 of the fret press device 1000 may be coupled to the third tier 1300, as shown in FIGS. 1 through 3. As best depicted in FIG. 2, the third tier 1300 comprises a bulkhead 1310 that has a top 1320 and a bottom 1330. The bottom 1330 of the bulkhead 1310 further comprises a first end 1340 and a second end 1350.

In some implementations, the second tier 1200 and the third tier 1300 of the fret press device 1000 may be pivotally coupled through a plurality of fasteners, such as fasteners 1215 and 1225. As best depicted in FIG. 1, the first end 1340 of the bottom 1330 of the bulkhead 1310 may include a gap 1344 to receive the top 1212 of the first interface plate 1210. The first end 1340 of the bulkhead 1310 and the top 1212 of the first interface plate 1210 may have corresponding bores for receiving fastener 1215. The second end 1350 of the bottom 1330 of the bulkhead 1310 may include a gap 1354 to receive the top 1222 of the second interface plate 1220. The second end 1350 of the bulkhead 1310 and the top 1222 of the second interface plate 1220 may have corresponding bores for receiving fastener 1225.

In some implementations, the third tier 1300 may be coupled to a yoke 1400. FIGS. 1 through 3 depict the yoke 1400 as a U-shaped component 1410. The U-shaped component 1410 comprises a left leg 1412, a right leg 1414, and a bottom 1416. In some implementations, the yoke 1400 may be pivotally coupled to the third tier 1300, such as via fastener 1325. FIGS. 1 through 3 depict the U-shaped component 1410 with the left leg 1412 and right leg 1414 facing downwards. As best depicted in FIG. 1, the bulkhead 1310 sits between the left leg 1412 and the right leg 1414 of the U-shaped component 1410. The left leg 1412 of the U-shaped component 1410, the top 1320 of the bulkhead 1310, and the right leg 1414 of the U-shaped component 1410 may have corresponding bores for receiving fastener 1325.

In some implementations, the yoke 1400 and a stem 1420 may be integrally formed into a one-piece component. In other implementations, the yoke 1400 may be coupled to the stem 1420. The stem 1420 comprises a top 1422 and a bottom 1424. The bottom 1416 of the U-shaped component 1410 may be coupled to the stem 1420 with a fastener.

In some implementations, the fasteners of the fret press device of the present disclosure may be off-the-shelf, standard fasteners such as stainless-steel shoulder screws, brass washers, and nylon lock nuts.

Figure 4:
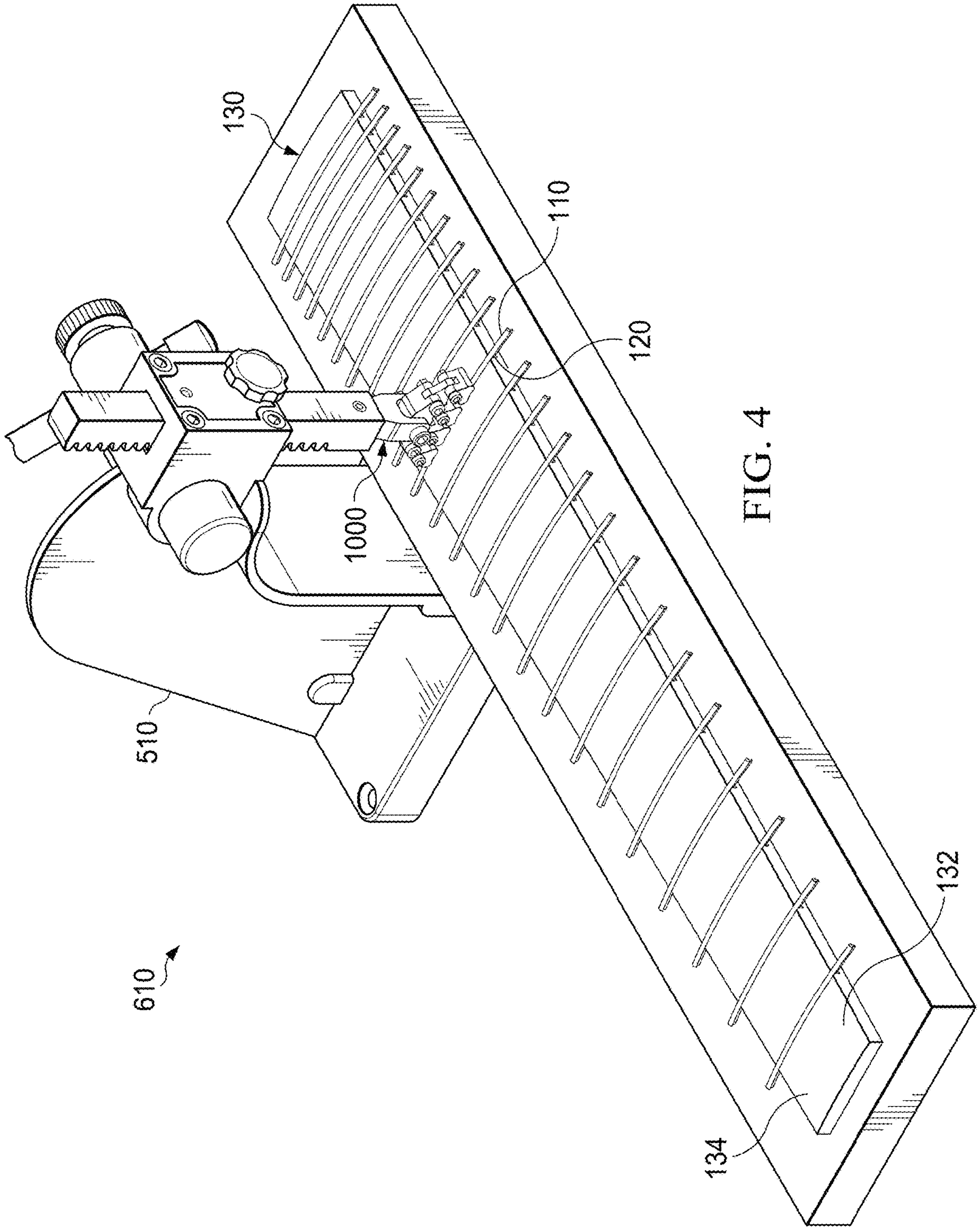
FIG. 4 illustrates a perspective view of the fret press device of FIG. 1 coupled to an arbor press in operation, depicting the fret press device seating a fret wire in a fret slot on a fingerboard of a stringed instrument, according to the present disclosure.
Figure 5:
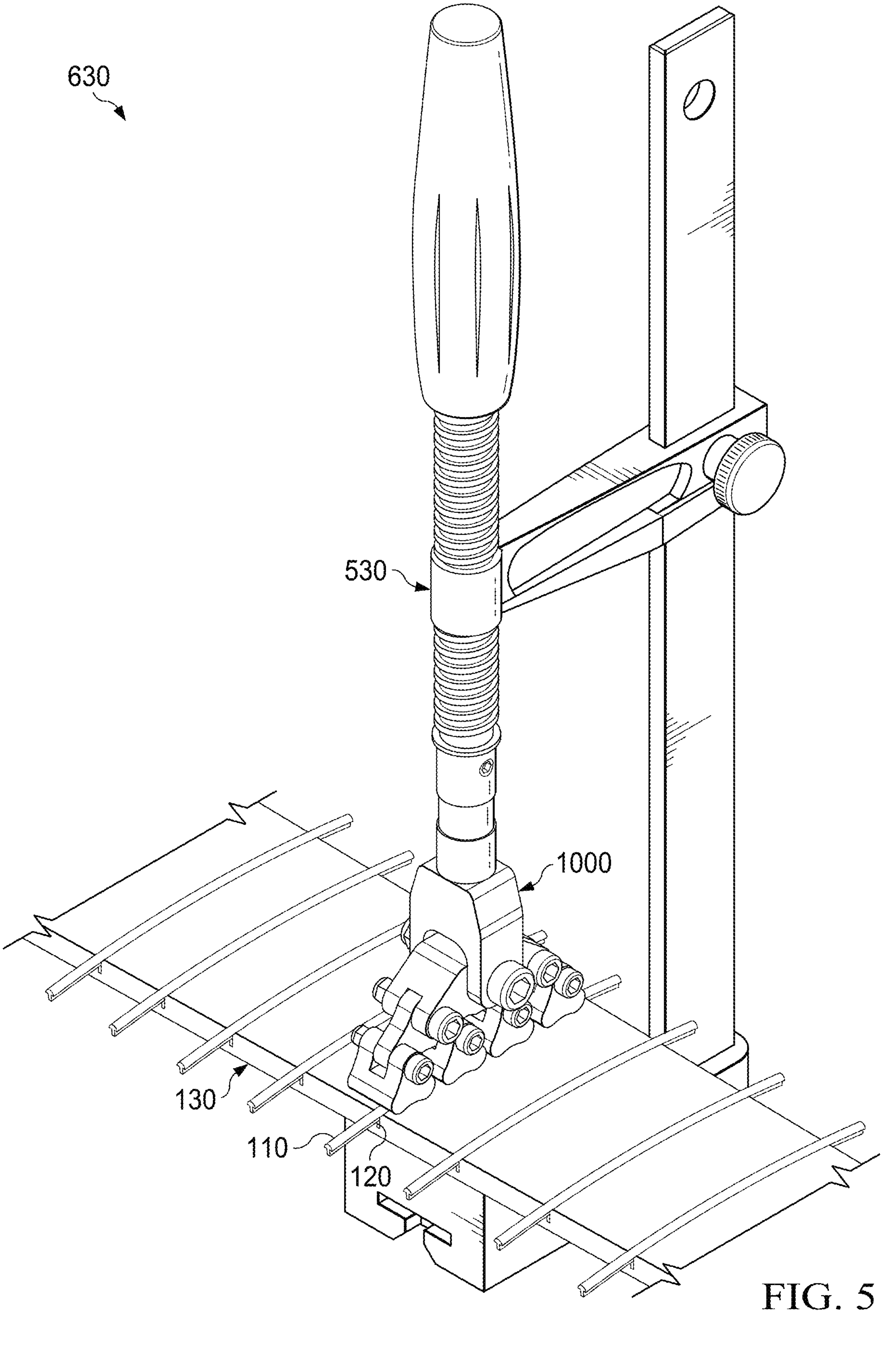
FIG. 5 illustrates a perspective view of another implementation of a fret press device coupled to a F-clamp in operation, depicting the fret press device seating a fret wire in a fret slot on a fingerboard of a stringed instrument, according to the present disclosure.

The top 1422 of the stem 1420 may be configured to couple to an apparatus 500 operable to apply mechanical force, such as an arbor press, a drill press, a F-clamp, or locking pliers, for example. FIGS. 4 and 5 illustrate perspective views of implementations of system 610 and system 630, respectively, of the present disclosure each comprising the fret press device 1000 coupled to an apparatus 500 operable to apply mechanical force, namely an arbor press 510 in FIG. 4 and a F-clamp 530 in FIG. 5. These systems 610, 630 are depicted in an operating environment with a fingerboard 130 of a stringed instrument having a plurality of fret slots, such as fret slot 120, and a plurality of fret wires, such as a fret wire 110 positioned upon the fret slot 120.

In some implementations, the fingerboard 130 of a stringed instrument may have a fixed concave radius along the length of the fingerboard 130, resulting in fret slots of uniform radii. In other implementations, the fingerboard 130 of a stringed instrument may have a compound or conical radius along the length of the fingerboard 130, with each fret slot becoming progressively flatter down the length of the fretboard 130. As best depicted in FIG. 4, the fingerboard 130 of a stringed instrument widens along the length of the fingerboard 130 resulting in fret slots, and subsequently seated fret wires, of varying radii.

One of the benefits of the fret press device of the present disclosure is the self-conforming, articulating feet that can engage fret wires in fret slots even if the fingerboard of a stringed instrument has varying radii along its length. When force is applied to the fret press device by the apparatus to which it is coupled, the lobes of the self-conforming, articulating feet engage the fret wire such that the lobes of the feet gently and evenly push the fret wires into the fret slots on the fingerboard of a stringed instrument, as described in more detail infra with respect to the method shown in the flowchart of FIG. 11. In this manner, the fret press device of the present disclosure may be used to install or seat fret wire in fingerboards of stringed instruments having common, uncommon, or inconsistent radii along the length of the fingerboard.

Another benefit of the fret press device of the present disclosure is that it improves the quality and consistency of fretwork being performed. For example, the fret press device of the present disclosure reduces common errors that may arise through conventional installation of fret wires in fret slots on fingerboards of stringed instruments, such as partially seated frets or uneven installation. In turn, this leads to other benefits of the fret press device of the present disclosure including decreased labor time in the installation of frets or in post-installation work, such as fret leveling.

Still another benefit of the fret press device of the present disclosure is that its usage for the installation of fret wires in fret slots on fingerboards of stringed instruments tends to avoid creating gaps at the center or the edges of a fret wire seated against the fingerboard surface.

The fret press device of the present disclosure may be in a flat state or in an engaged state. When the fret press device of the present disclosure is in a flat state, the fret press device is resting without force being applied. When the fret press device of the present disclosure is in an engaged state, the fret press device engages a fret wire in a fret slot on a fingerboard of a stringed instrument upon application of force to the device by the apparatus. In the flat and engaged state, the fret press device of the present disclosure has a spread between the far ends of the lobes of the outermost feet in the first tier. The spread differs depending on whether the fret press device is in the flat state or in the engaged state. In the engaged state, the spread further varies depending on the contact radius of each fret slot on the fingerboard.

FIG. 2 depicts the fret press device 1000 in a flat state. In the flat state, the fret press device 1000 may have a spread from the far end of lobe 1114 of the first foot 1110 to the far end of lobe 1146 of the fourth foot 1140 measuring approximately 1.515 inches.

In the engaged state, when the fret press device 1000 engages a fret in a fret slot on a fingerboard having a contact radius of 6 inches, for example, the spread from the far end of lobe 1114 of the first foot 1110 to the far end of lobe 1146 of the fourth foot 1140 may be approximately 1.422 inches.

When using the fret press device of the present disclosure in conjunction with common fret wire, which varies in length from 1.5 to 3 inches, the tight grouping of the lobes of the feet prevents "washboarding" or dips in the fret wire that may otherwise result when the pressure is displaced over larger gaps. The spread of the feet of the first tier of the fret press device keeps pressure lower when force is applied to the fret press device by the apparatus to reduce marring or impressions on fret wires when the fret press device engages fret wires in fret slots on fingerboards of stringed instruments.

In some implementations, the feet of the fret press device of the present disclosure, such as the first foot 1110, the second foot 1120, the third foot 1130, and the fourth foot 1140 of the fret press device 1000, each have a width measuring approximately 0.375 inches. A width of this approximate size may prevent the fret press device of the present disclosure from slipping off fret wires. Another benefit of a foot width of this approximate size is that it may contribute to the speed of installing fret wires into fret slots on fingerboards of stringed instruments because the fret press device does not need to be carefully placed parallel to the fret. Further, the fret press device does not need to remain parallel to function, as the self-conforming, articulating feet adjust even if the fret press device is slightly askew of the fret wire.

When selecting the material for the feet of the fret press device of the present disclosure, the material selected should be hard enough to seat fret wires into fret slots when the lobes of the feet of the fret press device engage the fret wires in fret slots on fingerboards of stringed instruments. At the same time, the material selected should be soft enough such that when force is applied to the fret press device via the apparatus, the fret or the top or crown of the fret wire does not deform when the lobes of the feet engage the fret wires in fret slots on fingerboards of stringed instruments. One such material is brass, but other materials having similar properties may also be selected.

Figure 6:
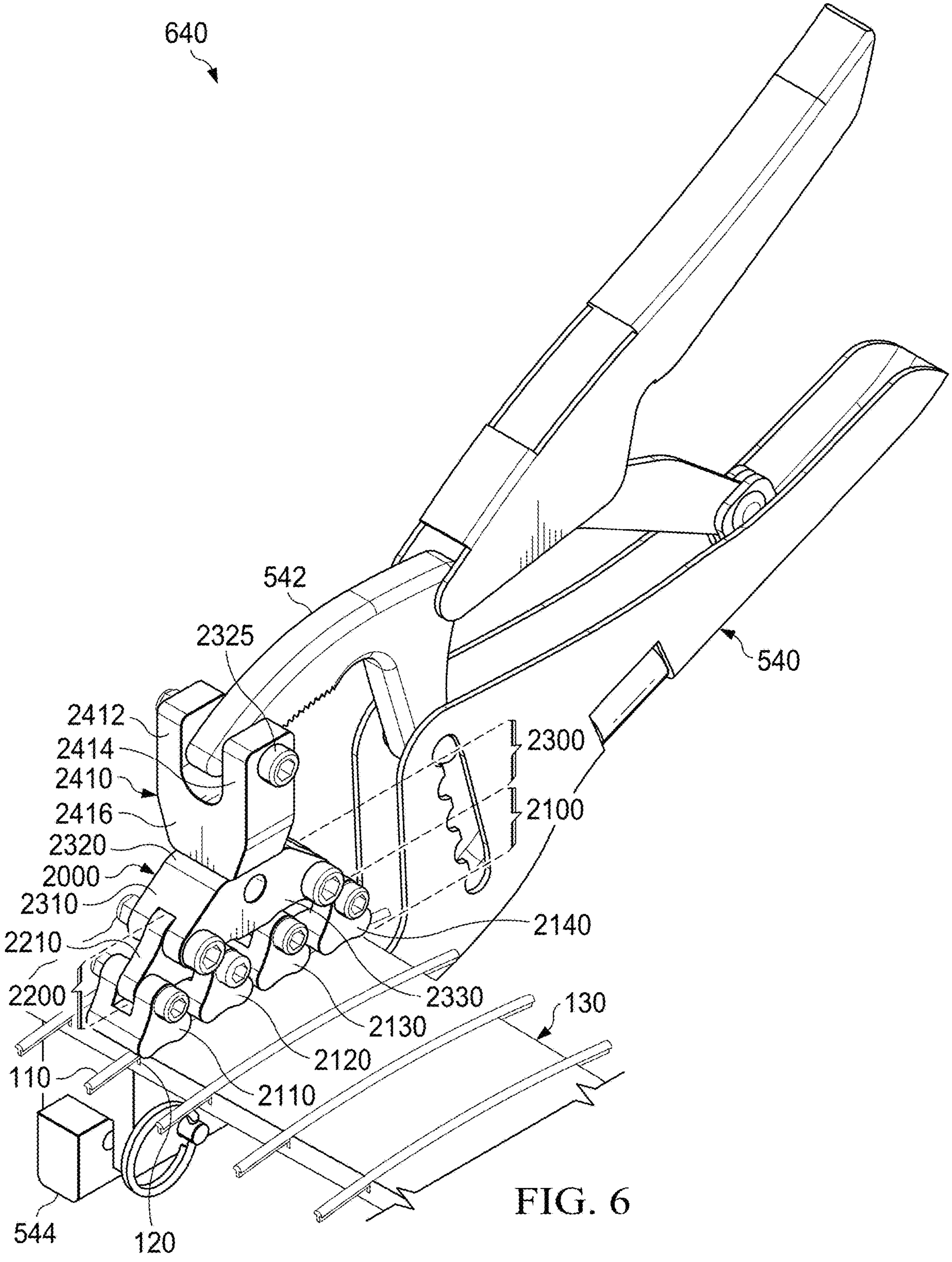
FIG. 6 illustrates a perspective view of yet another implementation of a fret press device coupled to locking pliers in operation, depicting the fret press device seating a fret wire in a fret slot on a fingerboard of a stringed instrument, according to the present disclosure.

Referring now to FIG. 6, which illustrates a perspective view of another implementation of a system 640 in operation, seating a fret wire in a fret slot on a fingerboard of a stringed instrument, according to the present disclosure. The system 640 comprises another implementation of a fret press device 2000 coupled to locking pliers 540 that have an upper jaw 542 and a lower jaw 544.

The fret press device 2000 comprises a cascading, tiered structure that includes a first tier 2100, a second tier 2200, and a third tier 2300. As shown in FIG. 6, the first tier 2100 of the fret press device 2000 comprises a first foot 2110, a second foot 2120, a third foot 2130, and a fourth foot 2140 that are substantially similar in form. The first foot 2110 has a top 2112 and a bottom 2113 with a curved surface comprising two lobes 2114 and 2116, and a concave portion 2118 between the lobes 2114 and 2116. The second foot 2120 has a top 2122 and a bottom 2123 with a curved surface comprising two lobes 2124 and 2126, and a concave portion 2128 between the lobes 2124 and 2126. The third foot 2130 has a top 2132 and a bottom 2133 with a curved surface comprising two lobes 2134 and 2136, and a concave portion 2138 between the lobes 2134 and 2136. The fourth foot 2140 has a top 2142 and a bottom 2143 with a curved surface comprising two lobes 2144 and 2146, and a concave portion 2148 between the lobes 2144 and 2146.

As shown in FIG. 6, the first tier 2100 of the fret press device 2000 is coupled to the second tier 2200. The second tier 2200 may include a first interface plate 2210 and a second interface plate 2220 that are substantially similar in form. The first interface plate 2210 has a top 2212 and a bottom 2214 with a first end 2216 and a second end 2218. The second interface plate 2220 has a top 2222 and a bottom 2224 with a first end 2226 and a second end 2228.

In some implementations, the first tier 2100 and the second tier 2200 may be pivotally coupled through a plurality of fasteners, such as fasteners 2115, 2125, 2135, and 2145. In more detail, the top 2112 of the first foot 2110 may include a gap 2111 to receive the first end 2216 of the bottom 2214 of the first interface plate 2210. The top 2112 of the first foot 2110 and the first end 2216 of the first interface plate 2210 may have corresponding bores for receiving fastener 2115 that provides a pivotal coupling therebetween.

Similarly, the top 2122 of the second foot 2120 may include a gap 2121 to receive the second end 2218 of the bottom of 2214 of the first interface plate 2210. The top 2122 of the second foot 2120 and the second end 2218 of the first interface plate 2210 may have corresponding bores for receiving fastener 2125 that provides a pivotal coupling therebetween.

The top 2132 of the third foot 2130 may include a gap 2131 to receive the first end 2226 of the bottom 2224 of the second interface plate 2220. The top 2132 of the third foot 2130 and the first end 2226 of the second interface plate 2220 may have corresponding bores for receiving fastener 2135 that provides a pivotal coupling therebetween.

Similarly, the top 2142 of the fourth foot 2140 may include a gap 2141 to receive the second end 2228 of the bottom 2224 of the second interface plate 2220. The top 2142 of the fourth foot 2140 and the second end 2228 of the second interface plate 2220 may have corresponding bores for receiving fastener 2145 that provides a pivotal coupling therebetween.

The second tier 2200 of the fret press device 2000 may be coupled to the third tier 2300, as shown in FIG. 6. The third tier 2300 comprises a bulkhead 2310 that has a top 2320 and a bottom 2330. The bottom 2330 of the bulkhead 2310 further comprises a first end 2340 and a second end 2350.

In some implementations, the second tier 2200 and the third tier 2300 of the fret press device 2000 may be pivotally coupled through a plurality of fasteners, such as fasteners 2215 and 2225. The first end 2340 of the bottom 2330 of the bulkhead 2310 may include a gap 2344 to receive the top 2212 of the first interface plate 2210. The first end 2340 of the bulkhead 2310 and the top 2212 of the first interface plate 2210 may have corresponding bores for receiving fastener 2215. The second end 2350 of the bottom 2330 of the bulkhead 2310 may include a gap 2354 to receive the top 2222 of the second interface plate 2220. The second end 2350 of the bulkhead 2310 and the top 2222 of the second interface plate 2220 may have corresponding bores for receiving fastener 2225.

In some implementations, the third tier 2300 and a yoke 2400 may be integrally formed into a one-piece component. In other implementations, the third tier 2300 may be coupled to the yoke 2400. FIG. 6 depicts the yoke 2400 as a U-shaped component 2410. The U-shaped component 2410 comprises a left leg 2412, a right leg 2414, and a bottom 2416. FIG. 6 depicts the U-shaped component 2410 with the left leg 2412 and right leg 2414 facing upwards. The left leg 2412 and the right leg 2414 of the U-shaped component 2410 may have corresponding bores for receiving a fastener 2325. As shown in FIG. 6, the top 2320 of the bulkhead 2310 and the bottom 2416 of the U-shaped component 2410 may be integrally formed into a one-piece component.

The fret press device 2000 may be configured to couple to an apparatus 500 operable to apply mechanical force, such as locking pliers 540 as depicted in FIG. 6. The locking pliers 540 may couple to the fastener 2325 of the U-shaped component 2410. FIG. 6 depicts the upper jaw 542 of the locking pliers 540 positioned between the left leg 2412 and the right leg 2414 of the U-shaped component 2410.

In some implementations, the fret press device 2000 is a reconfigured version of fret press device 1000. To reconfigure the fret press device 1000, the stem is removed from the yoke, and the yoke is removed from the bulkhead. The yoke is then inverted, and the fastener may be inserted through the bottom of the bulkhead and threaded into the yoke.

FIG. 6 illustrates the fret press device 2000 in an operating environment with the fingerboard 130 of a stringed instrument having a plurality of fret slots, such as fret slot 120, and a plurality of fret wires, such as the fret wire 110 positioned upon the fret slot 120. The system 640 depicted in FIG. 6 operates in substantially the same manner as the systems 610, 630 described supra with respect to FIGS. 4 through 5, and as described in further detail infra with respect to the method shown in the flowchart depicted in FIG. 11.

Figure 7:
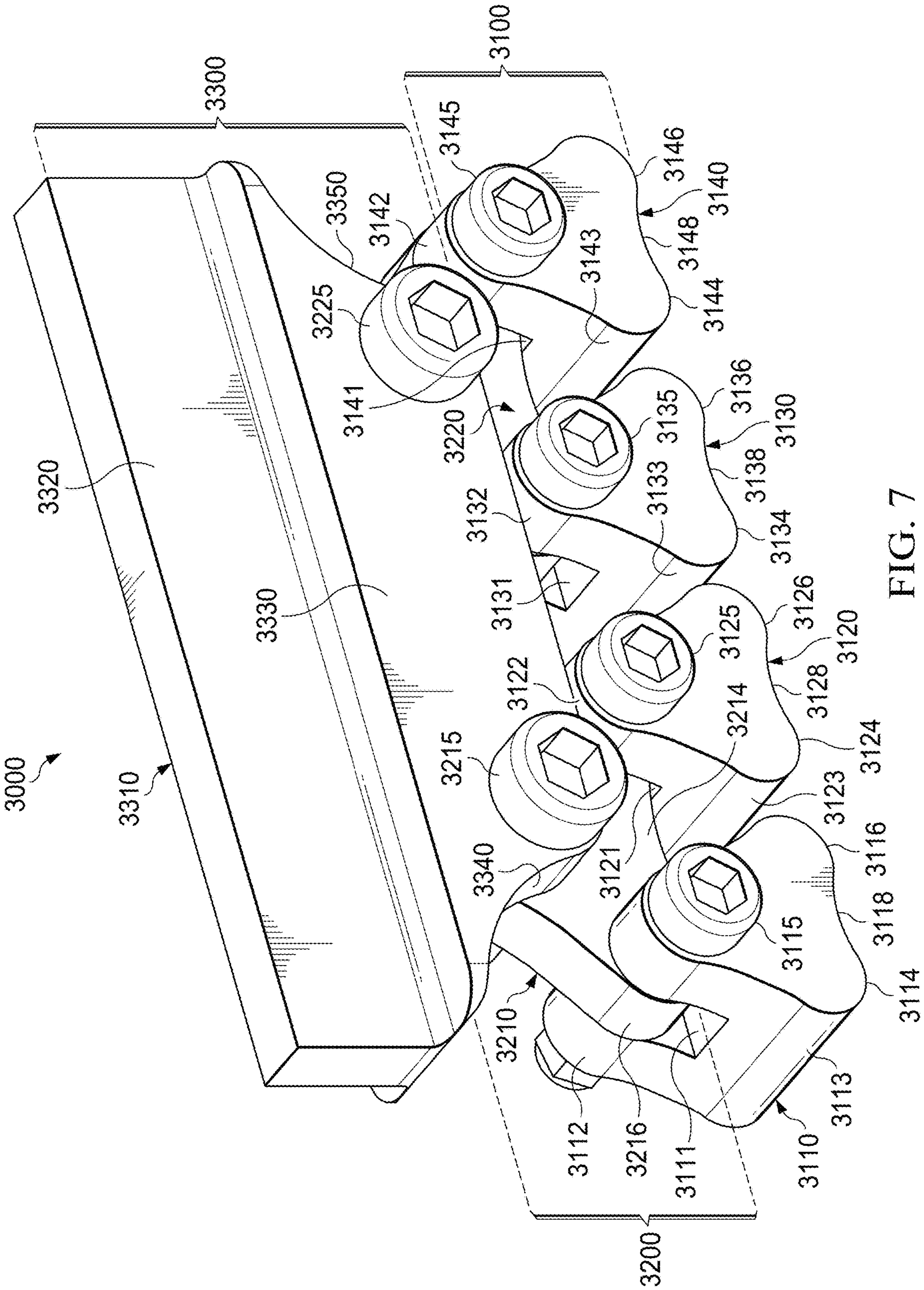
FIG. 7 illustrates a perspective view of still another implementation of a fret press device, according to the present disclosure.

FIG. 7 illustrates a perspective view of yet another implementation of a fret press device 3000 according to the present disclosure. The fret press device 3000 comprises a cascading, tiered structure that includes a first tier 3100, a second tier 3200, and a third tier 3300.

As shown in FIG. 7, the first tier 3100 of the fret press device 3000 comprises a first foot 3110, a second foot 3120, a third foot 3130, and a fourth foot 3140 that are substantially similar in form. The first foot 3110 has a top 3112 and a bottom 3113 with a curved surface comprising two lobes 3114 and 3116, and a concave portion 3118 between the lobes 3114 and 3116. The second foot 3120 has a top 3122 and a bottom 3123 with a curved surface comprising two lobes 3124 and 3126, and a concave portion 3128 between the lobes 3124 and 3126. The third foot 3130 has a top 3132 and a bottom 3133 with a curved surface comprising two lobes 3134 and 3136, and a concave portion 3138 between the lobes 3134 and 3136. The fourth foot 3140 has a top 3142 and a bottom 3143 with a curved surface comprising two lobes 3144 and 3146, and a concave portion 3148 between the lobes 3144 and 3146.

The first tier 3100 of the fret press device 3000 is coupled to the second tier 3200. As shown in FIG. 7, the second tier 3200 may include a first interface plate 3210 and a second interface plate 3220 that are substantially similar in form. The first interface plate 3210 has a top 3212 and a bottom 3214 with a first end 3216 and a second end 3218. The second interface plate 3220 has a top 3222 and a bottom 3224 with a first end 3226 and a second end 3228.

In some implementations, the first tier 3100 and the second tier 3200 may be pivotally coupled through a plurality of fasteners, such as fasteners 3115, 3125, 3135, and 3145. In more detail, the top 3112 of the first foot 3110 may include a gap 3111 to receive the first end 3216 of the bottom 3214 of the first interface plate 3210. The top 3112 of the first foot 3110 and the first end 3216 of the first interface plate 3210 may have corresponding bores for receiving fastener 3115 that provides a pivotal coupling therebetween.

Similarly, the top 3122 of the second foot 3120 may include a gap 3121 to receive the second end 3218 of the bottom of 3214 of the first interface plate 3210. The top 3122 of the second foot 3120 and the second end 3218 of the first interface plate 3210 may have corresponding bores for receiving fastener 3125 that provides a pivotal coupling therebetween.

As depicted in FIG. 7, the top 3132 of the third foot 3130 may include a gap 3131 to receive the first end 3226 of the bottom 3224 of the second interface plate 3220. The top 3132 of the third foot 3130 and the first end 3226 of the second interface plate 3220 may have corresponding bores for receiving fastener 3135 that provides a pivotal coupling therebetween.

Similarly, the top 3142 of the fourth foot 3140 may include a gap 3141 to receive the second end 3228 of the bottom 3224 of the second interface plate 3220. The top 3142 of the fourth foot 3140 and the second end 3228 of the second interface plate 3220 may have corresponding bores for receiving fastener 3145 that provides a pivotal coupling therebetween.

The second tier 3200 of the fret press device 3000 may be coupled to the third tier 3300, as shown in FIG. 7. The third tier 3300 comprises a bulkhead 3310 that has a flat, substantially smooth top 3320 and a bottom 3330. The bottom 3330 of the bulkhead 3310 further comprises a first end 3340 and a second end 3350.

In some implementations, the second tier 3200 and the third tier 3300 of the fret press device 3000 may be pivotally coupled through a plurality of fasteners, such as fasteners 3215 and 3225. The first end 3340 of the bottom 3330 of the bulkhead 3310 may include a gap 3344 to receive the top 3212 of the first interface plate 3210. The first end 3340 of the bulkhead 3310 and the top 3212 of the first interface plate 3210 may have corresponding bores for receiving fastener 3215. The second end 3350 of the bottom 3330 of the bulkhead 3310 may include a gap 3354 to receive the top 3222 of the second interface plate 3220. The second end 3350 of the bulkhead 3310 and the top 3222 of the second interface plate 3220 may have corresponding bores for receiving fastener 3225.

Similar to FIGS. 4 through 6, FIGS. 8 through 10 illustrate systems 710, 730, and 740, respectively, comprising the fret press device 3000 coupled to an apparatus 500 in an operating environment with the fingerboard 130 of a stringed instrument having a plurality of fret slots, such as fret slot 120, and a plurality of fret wires, such as the fret wire 110 positioned upon the fret slot 120.

Figure 9:
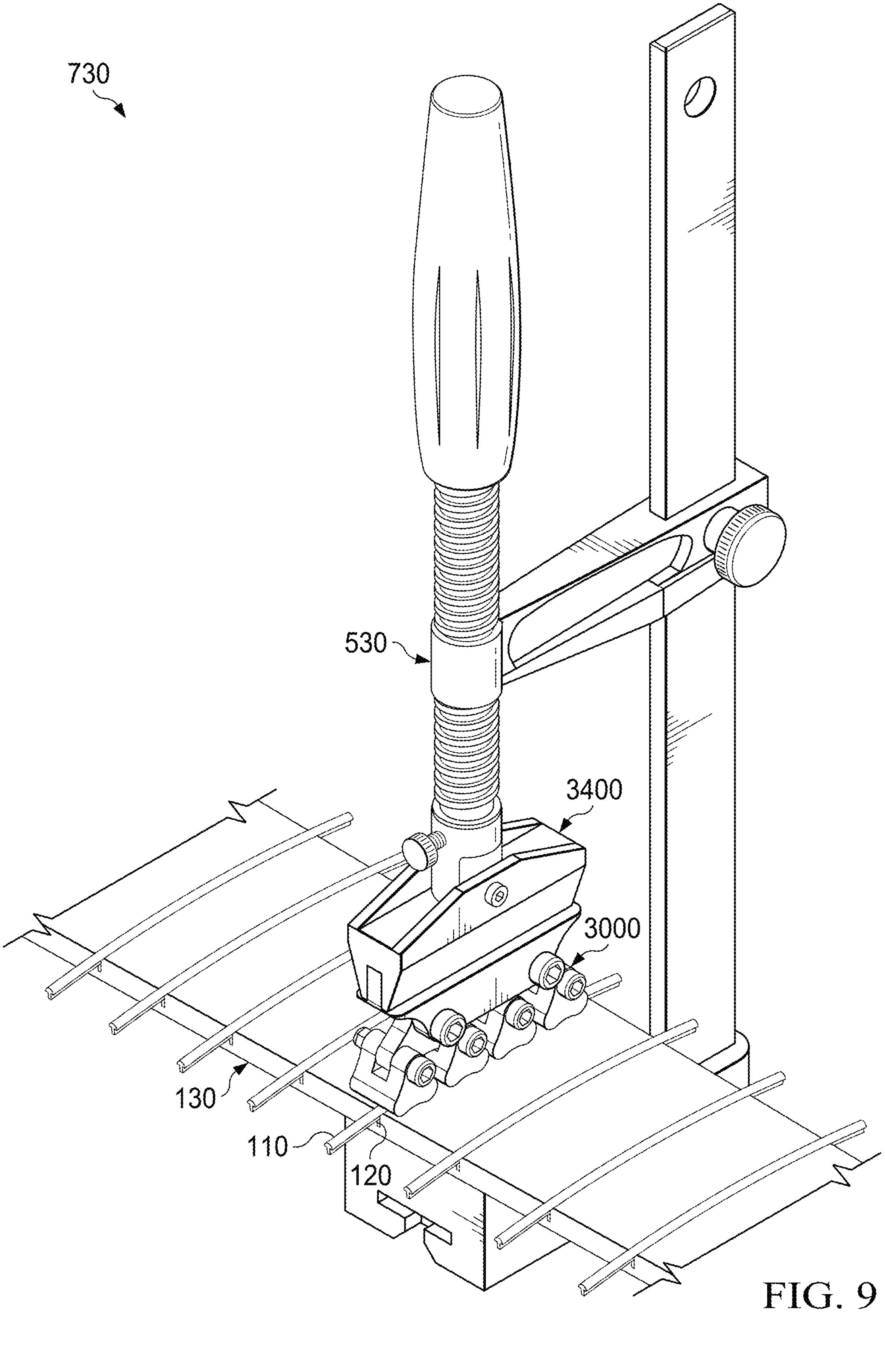
FIG. 9 illustrates the fret press device of FIG. 7 coupled to a F-clamp in operation, depicting the fret press device seating a fret wire in a fret slot on a fingerboard of a stringed instrument, according to the present disclosure.
Figure 10:
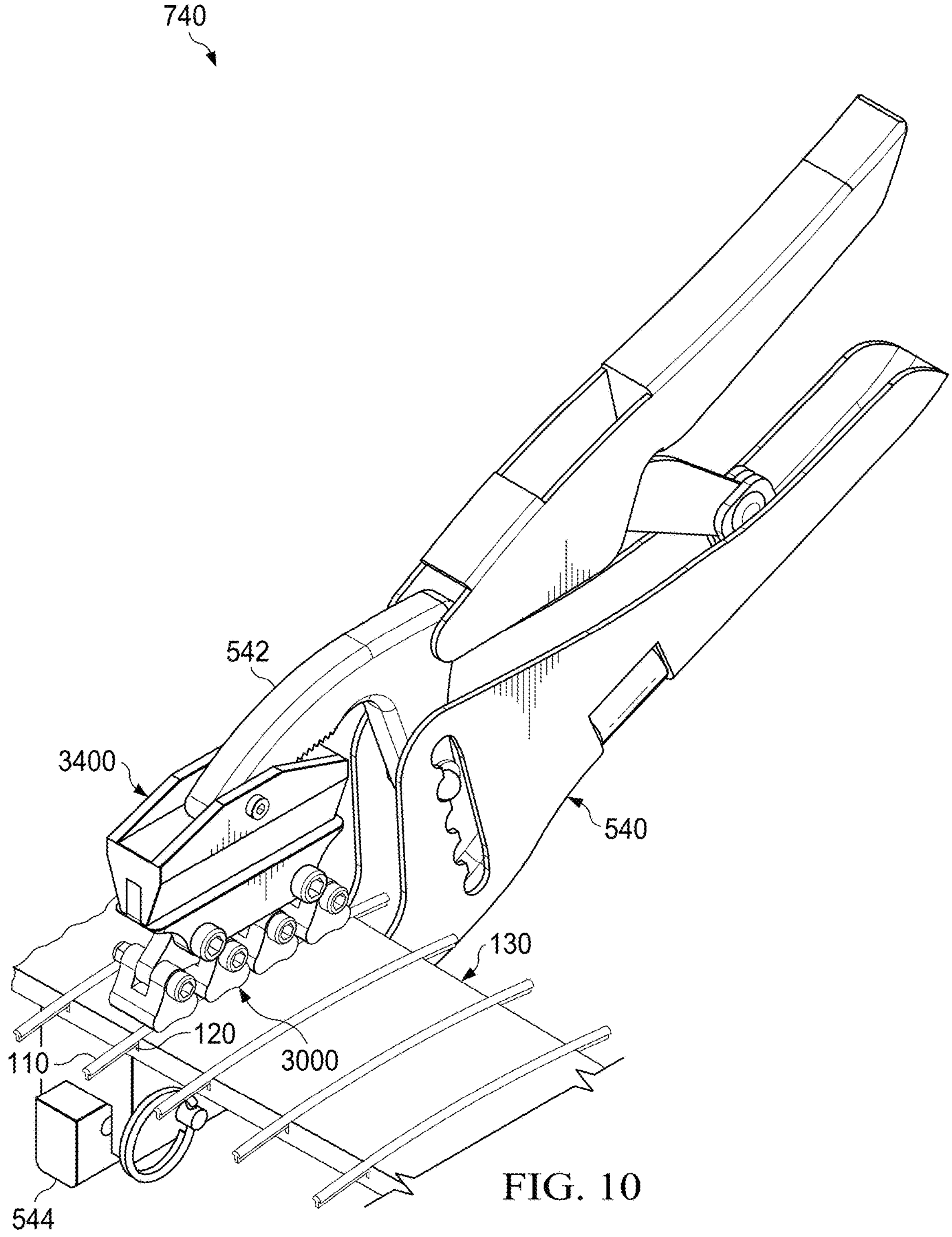
FIG. 10 illustrates the fret press device of FIG. 7 coupled to locking pliers in operation, depicting the fret press device seating a fret wire in a fret slot on a fingerboard of a stringed instrument, according to the present disclosure.

In some implementations, the third tier 3300 of the fret press device 3000 may be configured to couple to the apparatus 500 via a yoke that is a fret press caul 3400. The fret press caul 3400 may be a conventional, off-the-shelf fret press caul, such as those sold by retailer StewMac or other similar retailers. As best depicted in FIGS. 9 and 10, the fret press caul 3400 comprises a top 3410 and a bottom 3420. The top 3410 of the fret press caul 3400 includes an opening 3412 to receive apparatus 500, and the bottom 3420 of the fret press caul 3400 is designed with an opening 3422 that receives the flat, substantially smooth top 3320 of the bulkhead 3310.

Figure 8:
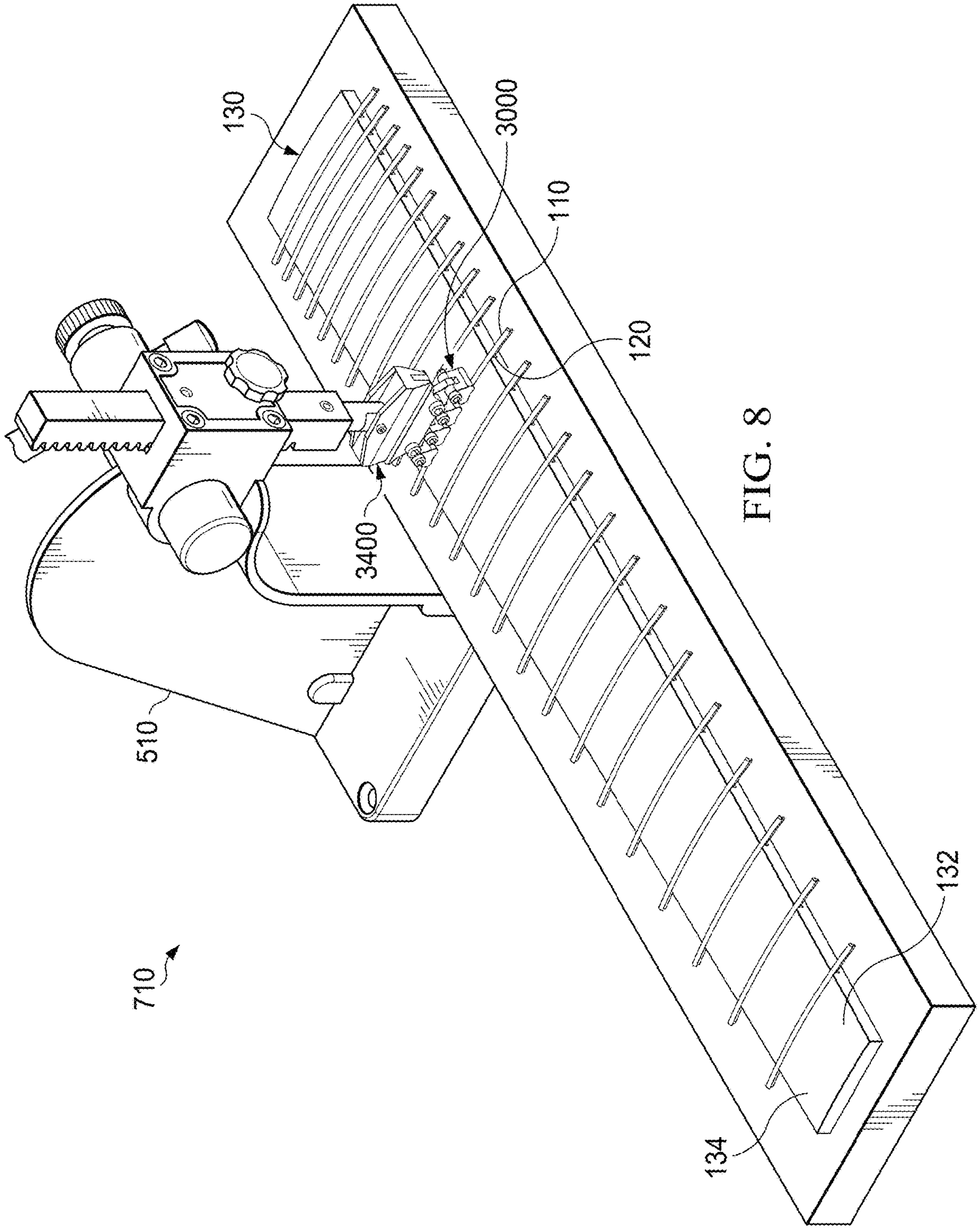
FIG. 8 illustrates the fret press device of FIG. 7 coupled to an arbor press in operation, depicting the fret press device seating a fret wire in a fret slot on a fingerboard of a stringed instrument, according to the present disclosure.

FIG. 8 depicts system 710 comprising the fret press device 3000 of FIG. 7 coupled to an arbor press 510 via fret press caul 3400. FIG. 9 depicts system 730 comprising the fret press device 3000 of FIG. 7 coupled to a F-clamp 530 via fret press caul 3400. FIG. 10 depicts system 740 comprising the fret press device 3000 of FIG. 7 coupled to locking pliers 540 via fret press caul 3400. In some implementations, the fret press caul 3400 is sold in combination with the apparatus 500, such as F-clamp 530 and/or locking pliers 540, for example. The systems 710, 730 and 740 depicted in FIGS. 8 through 10, respectively, operate in substantially the same manner as the systems 610, 630 and 640 described in detail supra with respect to FIGS. 4 through 6, and as described in further detail infra with respect to the method shown in the flowchart depicted in FIG. 11.

Referring now to FIG. 11, which illustrates a flowchart of an implementation of a method 100 of seating a fret wire 110 in a fret slot 120 on a fingerboard 130 of a stringed instrument, according to the present disclosure. The fret wire 110 has a first fret end 112 and a second fret end 114 that may extend beyond the sides of the fret slot 120 on the fingerboard 130. The fingerboard 130 has a bass side 132 and a treble side 134.

For demonstrative purposes, the method 100 for installing or seating fret wire 110 in fret slot 120 on fingerboard 130 of a stringed instrument will be described utilizing the fret press device 1000 coupled to apparatus 500. It is to be understood that the method 100 may be followed in a substantially similar manner by utilizing an alternative implementation of the fret press device, such as fret press device 2000 or 3000, instead of the fret press device 1000.

The method 100 may comprise the following steps. In step 1, couple the fret press device 1000 to the apparatus 500 operable to apply mechanical force. In step 2, orient the lobes 1114 and 1116 of the first foot 1110, the lobes 1124 and 1126 of the second foot 1120, the lobes 1134 and 1136 of the third foot 1130, and the lobes 1144 and 1146 of the fourth foot 1140 of the fret press device 1000 to face the fret wire 110 that is resting on the fret slot 120 and ready to be pressed onto the fingerboard 130 of a stringed instrument. In step 3, maintain the fret press device 1000 parallel with the fret wire 110 resting on the fret slot 120 of the fingerboard 130 of a stringed instrument.

In step 4, using the mechanical force apparatus 500, position the fret press device 1000 onto the bass side 132 or treble side 134 of the fingerboard 130 of the fret wire 110 that is to be pressed into the fret slot 120 on the fingerboard 130 by allowing the lobes 1114 and 1116 of the first foot 1110, the lobes 1124 and 1126 of the second foot 1120, the lobes 1134 and 1136 of the third foot 1130, and the lobes 1144 and 1146 of the fourth foot 1140 to make contact with the fret wire 110.

In step 5, using the mechanical force apparatus 500, gently press the fret press device 1000 to begin seating the fret wire 110 on the bass side 132 or treble side 134 of the fingerboard 130 of the fret wire 110 where the fret press device 1000 was positioned in step 4, but do not completely seat the fret wire 110.

In step 6, using the mechanical force apparatus 500, raise the fret press device 1000 and position the fret press device 1000 onto the opposite side (bass side 132 or treble side 134) of the fingerboard 130, of the fret wire 110 by allowing the lobes 1114 and 1116 of the first foot 1110, the lobes 1124 and 1126 of the second foot 1120, the lobes 1134 and 1136 of the third foot 1130, and the lobes 1144 and 1146 of the fourth foot 1140 to make contact with the fret wire 110.

In step 7, using the mechanical force apparatus 500, gently press the fret press device 1000 to begin seating the fret wire 110 on the opposite side (bass side 132 or treble side 134) of the fingerboard 130, of the fret wire where the fret press device 1000 was positioned in step 6, but do not completely seat the fret wire 110.

Once completed, move onto step 8. In step 8, repeat steps 4 through 7 to completely seat the fret wire 110 in the fret slot 120 on the fingerboard 130 of the stringed instrument.

After the fret wire 110 has been seated in the fret slot 120 on the fingerboard 130 of the stringed instrument, the ends 112 and 114 of the fret wire 110 may be bent following step 9, if desired. In step 9, bend the fret end 112 and/or 114 of the fret wire 110 over the end of the fingerboard 130 by placing the fret press device 1000 over the overhang of the fret end 112 or 114 and applying pressure to the fret end 112 or 114 until a desired overbend is obtained.

Figure 12:
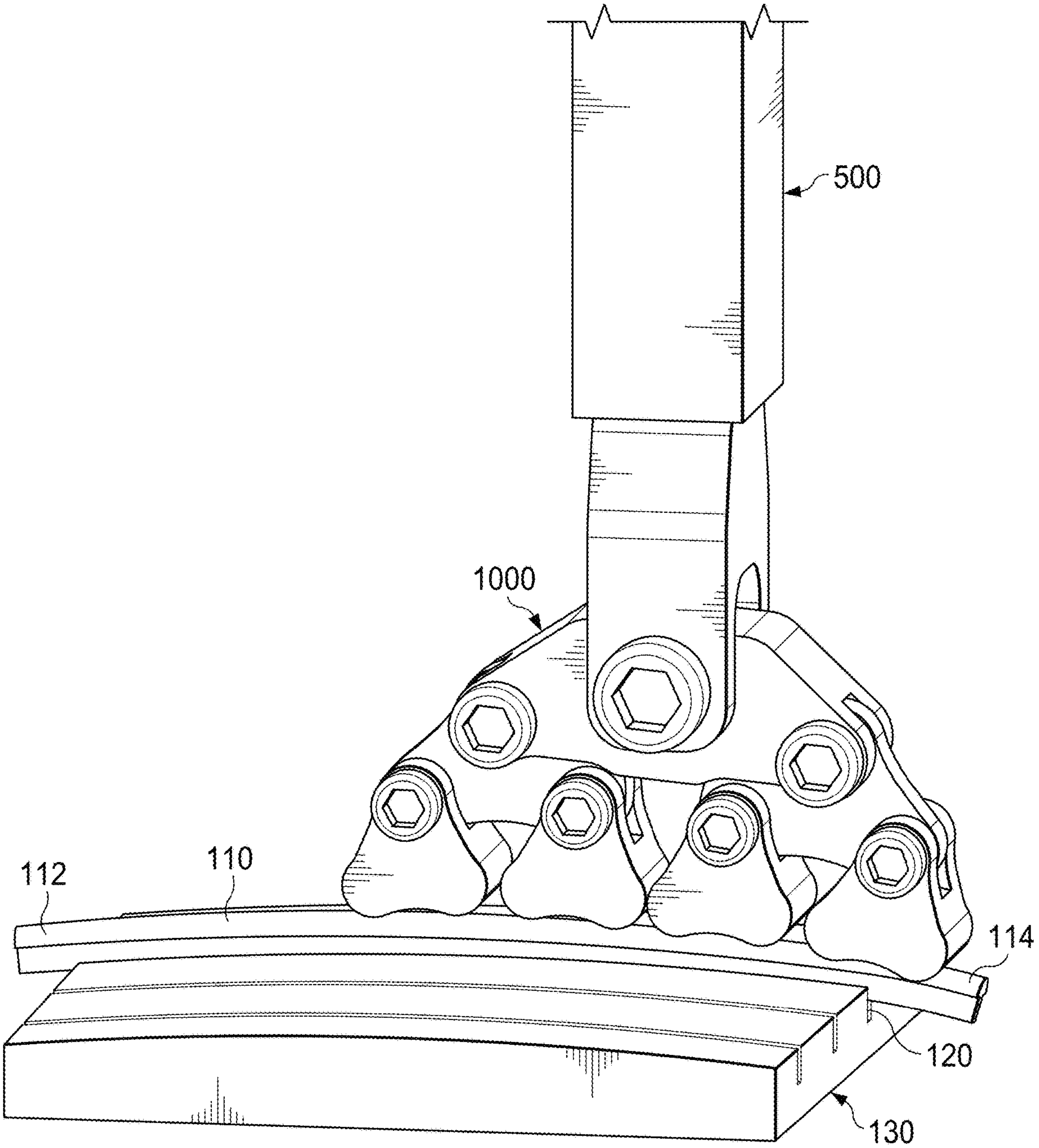
FIG. 12 illustrates a perspective view of the fret press device of FIG. 1 coupled to an apparatus operable to apply mechanical force in operation, depicting the fret press device bending an overhang of a fret wire in a fret slot on a fingerboard, according to the present disclosure.

Regarding step 9 of the method 100, FIG. 12 illustrates a perspective view of the fret press device 1000 bending an overhang of the fret end 114 of the fret wire 110 in the fret slot 120 on the fingerboard 130, according to the present disclosure.

The fret press device of the present disclosure allows for the overhang of fret ends of fret wires in fret slots on fingerboards of stringed instruments to be bent in a controlled manner. When the fret press device of the present disclosure is situated over the fingerboard and extended to the overhang of a fret end of a fret wire in a fret slot on a fingerboard, pressure can be applied gradually to the fret press device via the apparatus. The lobes of the feet which engage an unsupported portion of the fret wire gently and predictably bend the overhang of the fret end, while the lobes of the feet engaging with the fret wire in the fret slot on the fingerboard maintain pressure against a seated fret, preventing the fret wire from popping out of the fret slot.

It is also to be understood that the terminology used herein is for the purpose of describing particular implementations only, and is not intended to be limiting. As used in this specification, the singular forms "a", "an" and "the" include plural referents unless the content clearly indicates otherwise. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A fret press device comprising:

a stem;

a yoke coupled to the stem;

a bulkhead comprising a top and a bottom, wherein the bottom has a first end and a second end, and wherein the yoke is pivotally coupled to the top of the bulkhead;

a first interface plate comprising a top and a bottom, wherein the bottom of the first interface plate has a first end and a second end, and wherein the first end of the bulkhead is pivotally coupled to the top of the first interface plate;

a second interface plate comprising a top and a bottom, wherein the bottom of the second interface plate has a first end and a second end, and wherein the second end of the bulkhead is pivotally coupled to the top of the second interface plate;

a first foot comprising a top and a bottom, wherein the bottom of the first foot has a curved surface comprising two lobes with a concave portion therebetween, and wherein the first end of the first interface plate is pivotally coupled to the top of the first foot;

a second foot comprising a top and a bottom, wherein the bottom of the second foot has a curved surface comprising two lobes with a concave portion therebetween, and wherein the second end of the first interface plate is pivotally coupled to the top of the second foot;

a third foot comprising a top and a bottom, wherein the bottom of the third foot has a curved surface comprising two lobes with a concave portion therebetween, and wherein the first end of the second interface plate is pivotally coupled to the top of the third foot; and a fourth foot comprising a top and a bottom, wherein the bottom of the fourth foot has a curved surface comprising two lobes with a concave portion therebetween, and wherein the second end of the second interface plate is pivotally coupled to the top of the fourth foot.

2. A system comprising:

the fret press device of claim 1 coupled to an apparatus operable to apply mechanical force.

3. The system of claim 2, wherein the apparatus is an arbor press.

4. The system of claim 2, wherein the apparatus is a drill press.

5. The system of claim 2, wherein the apparatus is a F-clamp.

6. A method for seating a fret with a bass side and a treble side in a fret slot on a fingerboard of a stringed instrument using the system of claim 2, the method comprising:

(a) positioning the fret press device above the fingerboard;

(b) orienting the lobes of the feet of the fret press device to face the fret resting on the fret slot;

(c) maintaining the fret press device parallel with the fret;

(d) using the mechanical force apparatus, positioning the fret press device until the lobes of the feet of the fret press device make contact with the bass or treble side of the fret;

(e) using the mechanical force apparatus, pressing the fret press device to begin seating the fret into the fret slot on the bass or treble side of the fret where the fret press device was positioned in step (d);

(f) using the mechanical force apparatus, positioning the fret press device until the lobes of the feet of the fret press device make contact with the bass or treble side of the fret opposite the side that was selected in step (d);

(g) using the mechanical force apparatus, pressing the fret press device to begin seating the fret into the fret slot on the bass or treble side of the fret selected in step (f); and (h) repeating steps (d) through (g) until the fret is seated in the fret slot.

7. The method of claim 6, further comprising:

after the fret has been seated, then using the mechanical force apparatus, positioning the fret press device to extend at least partially over an overhang of the fret and applying pressure between the fret press device and the overhang of the fret until a desired overbend of the overhang of the fret is obtained.

8. A system comprising:

a fret press device comprising:

a yoke configured to couple to an apparatus operable to apply mechanical force;

a bulkhead coupled to the yoke;

at least two interface plates pivotally coupled to the bulkhead; and two lobed feet pivotally coupled to each of the interface plates; and the apparatus, wherein the apparatus comprises means for applying a mechanical force to the fret press device for installing a fret in a fret slot of a fingerboard of a stringed instrument.

9. A method for seating a fret with a bass side and a treble side in a fret slot on a fingerboard of a stringed instrument using the system of claim 8, the method comprising:

(a) positioning the fret press device above the fingerboard;

(b) orienting the lobes of the feet of the fret press device to face the fret resting on the fret slot;

(c) maintaining the fret press device parallel with the fret;

(d) using the mechanical force apparatus, positioning the fret press device until the lobes of the feet of the fret press device make contact with the bass or treble side of the fret;

(e) using the mechanical force apparatus, pressing the fret press device to begin seating the fret into the fret slot on the bass or treble side of the fret where the fret press device was positioned in step (d);

(f) using the mechanical force apparatus, positioning the fret press device until the lobes of the feet of the fret press device make contact with the bass or treble side of the fret opposite the side that was selected in step (d);

(g) using the mechanical force apparatus, pressing the fret press device to begin seating the fret into the slot on the bass or treble side of the fret selected in step (f); and (h) repeating steps (d) through (g) until the fret is seated in the fret slot.

10. The method of claim 9, further comprising:

after the fret has been seated, then using the mechanical force apparatus, positioning the fret press device to extend at least partially over an overhang of the fret and applying pressure between the fret press device and the overhang of the fret until a desired overbend of the overhang of the fret is obtained.

11. A system comprising:

a fret press device comprising:

a cascading, tiered structure comprising at least a first tier and a second tier. wherein the first tier comprises a plurality of lobed feet each pivotally coupled to a component of the second tier, and wherein the device is configured to couple to an apparatus operable to apply mechanical force; and the apparatus, wherein the apparatus comprises means for applying a mechanical force to the fret press device for installing a fret in a fret slot of a fingerboard of a stringed instrument.

12. A method for seating a fret with a bass side and a treble side in a fret slot on a fingerboard of a stringed instrument using the system of claim 11, the method comprising:

(a) positioning the fret press device above the fingerboard;

(b) orienting the lobes of the feet of the fret press device to face the fret resting on the fret slot;

(c) maintaining the fret press device parallel with the fret;

(d) using the mechanical force apparatus, positioning the fret press device until the lobes of the feet of the fret press device make contact with the bass or treble side of the fret;

(e) using the mechanical force apparatus, pressing the fret press device to begin seating the fret into the fret slot on the bass or treble side of the fret where the fret press device was positioned in step (d);

(f) using the mechanical force apparatus, positioning the fret press device until the lobes of the feet of the fret press device make contact with the bass or treble side of the fret opposite the side that was selected in step (d);

(g) using the mechanical force apparatus, pressing the fret press device to begin seating the fret into the fret slot on the bass or treble side of the fret selected in step (f); and (h) repeating steps (d) through (g) until the fret is seated in the fret slot.

13. The method of claim 12, further comprising:

after the fret has been seated, then using the mechanical force apparatus, positioning the fret press device to extend at least partially over an overhang of the fret and applying pressure between the fret press device and the overhang of the fret until a desired overbend of the overhang of the fret is obtained.

* * * * *